US008996543B2

(12) United States Patent
Seryakov et al.

(10) Patent No.: US 8,996,543 B2
(45) Date of Patent: Mar. 31, 2015

(54) METHOD AND SYSTEM FOR IDENTIFYING AND ACCESSING MULTIMEDIA CONTENT

(75) Inventors: Vladyslav A. Seryakov, Reston, VA (US); Stuart A. White, Playa Vista, CA (US)

(73) Assignee: Arrabon Management Services, LLC, Santa Monica, CA (US)

( * ) Notice: Subject to any disclaimer, the term of this patent is extended or adjusted under 35 U.S.C. 154(b) by 0 days.

(21) Appl. No.: 13/357,279

(22) Filed: Jan. 24, 2012

(65) Prior Publication Data

US 2013/0191403 A1    Jul. 25, 2013

(51) Int. Cl.
*G06F 17/30* (2006.01)
*H04N 21/258* (2011.01)
*H04N 21/45* (2011.01)
*H04N 21/658* (2011.01)

(52) U.S. Cl.
CPC .... *G06F 17/30029* (2013.01); *H04N 21/25891* (2013.01); *H04N 21/4532* (2013.01); *H04N 21/6582* (2013.01)
USPC .......................................................... 707/754

(58) Field of Classification Search
CPC .................... G06F 17/30029; G06F 17/30867; G06F 17/30699
USPC .......................................................... 707/754
See application file for complete search history.

(56) References Cited

U.S. PATENT DOCUMENTS

| | | | |
|---|---|---|---|
| 4,520,404 A | 5/1985 | Von Kohorn | |
| 4,605,964 A | 8/1986 | Chard | |
| 5,598,276 A | 1/1997 | Cookson | |
| 5,664,046 A | 9/1997 | Abecassis | |
| 5,778,135 A | 7/1998 | Ottesen et al. | |
| 5,835,087 A | 11/1998 | Herz et al. | |
| 6,075,550 A | 6/2000 | Lapierre | |
| 6,133,912 A | 10/2000 | Montero | |
| 6,226,793 B1 | 5/2001 | Kwoh | |
| 6,269,216 B1 | 7/2001 | Abecassis | |
| 6,337,947 B1 | 1/2002 | Porter | |
| 6,351,596 B1 | 2/2002 | Ostrover | |
| 6,393,196 B1 | 5/2002 | Yamane et al. | |

(Continued)

OTHER PUBLICATIONS

Office Action in related U.S. Appl. No. 13/648,934 dated May 31, 2013, 32 pages.

(Continued)

*Primary Examiner* — Joshua Bullock
(74) *Attorney, Agent, or Firm* — Lathrop & Gage LLP (57) ABSTRACT

Methods, systems, and subsystems for identifying and accessing multimedia content are provided. One external library access module includes instructions, stored on computer readable media, that, when executed by a processor, perform steps for: accessing personal profile settings stored in computer readable media, the profile settings including personal settings relating to filtering content; accessing an external search engine used to identify content on a network, the engine having an adjustable content filter; and selecting a setting of the filter based on the personal settings. In another embodiment, a method for identifying and accessing multimedia content from a network includes: filtering content described in a first compilation of data in strict adherence to personal settings relating to filtering content; and using an external filter to filter content accessible from the network through an external search engine. A setting of the external filter is automatically selected based on the personal settings.

9 Claims, 9 Drawing Sheets

(56) References Cited

U.S. PATENT DOCUMENTS

| | | |
|---|---|---|
| 6,430,357 B1 | 8/2002 | Orr |
| 6,481,011 B1 | 11/2002 | Lemmons |
| 6,519,770 B2 | 2/2003 | Ford |
| 6,757,482 B1 | 6/2004 | Ochial et al. |
| 6,771,875 B1 | 8/2004 | Kunieda et al. |
| 6,813,438 B1 | 11/2004 | Bates et al. |
| 6,867,818 B2 | 3/2005 | Bray |
| 6,889,383 B1 | 5/2005 | Jarman |
| 6,898,799 B1 | 5/2005 | Jarman |
| 6,954,584 B2 | 10/2005 | Kashiwagi |
| 6,972,802 B2 | 12/2005 | Bray |
| 6,976,265 B1 | 12/2005 | Yang |
| 7,139,031 B1 | 11/2006 | Bray |
| 7,284,202 B1 | 10/2007 | Zenith |
| 7,342,917 B2 | 3/2008 | Mohan et al. |
| 7,360,234 B2 | 4/2008 | Robson |
| 7,526,784 B2 | 4/2009 | Jarman |
| 7,540,009 B1 | 5/2009 | Bryant |
| 7,543,068 B2 * | 6/2009 | Aaron et al. ............... 709/228 |
| 7,543,318 B2 | 6/2009 | Jarman |
| 7,577,970 B2 | 8/2009 | Jarman |
| 7,634,790 B2 | 12/2009 | Finseth et al. |
| 7,684,438 B2 | 3/2010 | Stephens et al. |
| 7,870,166 B2 | 1/2011 | Lutnick |
| 7,877,395 B2 | 1/2011 | Sarukkai et al. |
| 8,019,707 B2 | 9/2011 | Shani et al. |
| 8,170,971 B1 | 5/2012 | Wilson et al. |
| 2001/0001159 A1 | 5/2001 | Ford |
| 2001/0039657 A1 | 11/2001 | Fopeano et al. |
| 2002/0106188 A1 | 8/2002 | Crop |
| 2002/0147782 A1 | 10/2002 | Dimitrova et al. |
| 2003/0014407 A1 | 1/2003 | Blatter et al. |
| 2003/0049014 A1 | 3/2003 | Siddiqui |
| 2003/0093790 A1 | 5/2003 | Logan et al. |
| 2003/0122966 A1 | 7/2003 | Markman et al. |
| 2003/0131352 A1 | 7/2003 | Dutta et al. |
| 2003/0186645 A1 | 10/2003 | Mori |
| 2003/0192044 A1 * | 10/2003 | Huntsman ............... 725/25 |
| 2004/0025180 A1 | 2/2004 | Begeja et al. |
| 2004/0096188 A1 | 5/2004 | Kageyama |
| 2005/0015795 A1 | 1/2005 | Iggulden |
| 2005/0086255 A1 | 4/2005 | Schran et al. |
| 2005/0086696 A1 | 4/2005 | Daniels |
| 2005/0086705 A1 | 4/2005 | Jarman |
| 2005/0132401 A1 | 6/2005 | Boccon-Gibod et al. |
| 2005/0144641 A1 | 6/2005 | Lewis |
| 2005/0204380 A1 | 9/2005 | Lee |
| 2005/0210507 A1 * | 9/2005 | Hawkins et al. ............... 725/46 |
| 2006/0020973 A1 | 1/2006 | Hannum et al. |
| 2006/0031870 A1 | 2/2006 | Jarman et al. |
| 2006/0130119 A1 | 6/2006 | Candelore |
| 2006/0179455 A1 * | 8/2006 | Jun et al. ............... 725/46 |
| 2006/0184983 A1 | 8/2006 | Casey |
| 2006/0212900 A1 | 9/2006 | Ismail et al. |
| 2006/0215990 A1 | 9/2006 | Proebstel |
| 2006/0282856 A1 | 12/2006 | Errico et al. |
| 2007/0055980 A1 | 3/2007 | Megeid |
| 2007/0098362 A1 | 5/2007 | Sharma |
| 2007/0186235 A1 | 8/2007 | Jarman |
| 2007/0204287 A1 | 8/2007 | Conradt et al. |
| 2007/0204288 A1 | 8/2007 | Candelore |
| 2007/0250863 A1 | 10/2007 | Ferguson |
| 2007/0260603 A1 | 11/2007 | Tuscano et al. |
| 2008/0040151 A1 | 2/2008 | Moore |
| 2008/0147711 A1 | 6/2008 | Spiegelman et al. |
| 2008/0307339 A1 | 12/2008 | Boro et al. |
| 2009/0049467 A1 * | 2/2009 | Robson et al. ............... 725/28 |
| 2009/0089251 A1 | 4/2009 | Johnston et al. |
| 2009/0150246 A1 | 6/2009 | Meenakshi et al. |
| 2009/0177689 A1 | 7/2009 | Song et al. |
| 2009/0222849 A1 | 9/2009 | Peters |
| 2009/0231968 A1 | 9/2009 | Ochi et al. |
| 2009/0271826 A1 | 10/2009 | Lee et al. |
| 2009/0310932 A1 | 12/2009 | Hsieh |
| 2009/0313301 A9 | 12/2009 | Reed et al. |
| 2010/0077428 A1 | 3/2010 | Arnold et al. |
| 2010/0094799 A1 | 4/2010 | Ohashi et al. |
| 2010/0138517 A1 | 6/2010 | DeLos Reyes et al. |
| 2010/0223259 A1 | 9/2010 | Mizrahi |
| 2010/0235535 A1 | 9/2010 | Zhu |
| 2010/0262556 A1 | 10/2010 | Shaya et al. |
| 2010/0287293 A1 | 11/2010 | Wright et al. |
| 2011/0072037 A1 | 3/2011 | Lotzer |
| 2011/0087649 A1 * | 4/2011 | Sarukkai et al. ............... 707/710 |
| 2011/0225156 A1 | 9/2011 | Pavlik |
| 2011/0276993 A1 | 11/2011 | Ferguson |

OTHER PUBLICATIONS

Office Action in related U.S. Appl. No. 13/357,303 dated Jun. 11, 2013, 28 pages.

U.S. Appl. No. 13/357,303 Office Action dated Jan. 28, 2014, 24 pages.

U.S. Appl. No. 13/357,303 Response filed Apr. 7, 2014, 13 pages.

U.S. Appl. No. 13/357,303 Advisory Action dated Apr. 24, 2014, 3 pages.

U.S. Appl. No. 13/357,303 Request for Continued Examination filed Jul. 28, 2014, 13 pages.

U.S. Appl. No. 13/648,934 Office Action dated Feb. 7, 2014, 26 pages.

U.S. Appl. No. 13/648,934 Response and Request for Continued Examination filed Aug. 7, 2014, 25 pages.

U.S. Appl. No. 13/648,934 Notice of Allowance issued Oct. 7, 2014, 10 pages.

U.S. Appl. No. 13/554,660 Office Action dated Nov. 19, 2014, 48 pages.

* cited by examiner

METHOD AND SYSTEM FOR IDENTIFYING AND ACCESSING MULTIMEDIA CONTENT

BACKGROUND

Although the production of multimedia content is expanding at ever increasing rates, much of that content is overlooked due to insufficiencies in identification and access. Shortcomings in identification and access can relate to various problems, ranging for example from finding the content to knowing the subject matter and appropriateness of the content. Knowing whether content is appropriate for various users may be of particular interest to families and those with particular moral preferences. Methods, systems, and subsystems set forth herein may improve the identification of, and/or access to, multimedia content.

SUMMARY

Methods, systems, and subsystems for identifying and accessing multimedia content are set forth herein. In one embodiment, an external library access module is disclosed for use in a system for identifying and accessing multimedia content that includes a server and a local device each having access to a network. The external library access module includes instructions, stored on computer readable media, and the instructions, when executed by a processor, perform steps for: (a) accessing personal profile settings stored in computer readable media, the personal profile settings including personal settings relating to filtering content; (b) accessing an external search engine used to identify content on the network, the external search engine having an adjustable content filter; and (c) selecting a setting of the adjustable content filter based on the personal settings relating to filtering content.

In another embodiment, a system for identifying and accessing multimedia content from a network includes a server and a local device. The server has a first processor in data communication with a first communication device, a first input device, a first output device, and first computer memory. The first computer memory has an encyclopedic database, and the encyclopedic database has an accumulation of subject matter data about a first portion of the multimedia content. The local device has a second processor in data communication with a second communication device, a second input device, a second output device, and second computer memory. The second processor is in data communication with a user library content file located in at least one of the first computer memory and the second computer memory, and the user library content file has data distilled from the encyclopedic database. The second processor is in data communication with a user local settings file located in at least one of the first computer memory and the second computer memory, and the user local settings file has personal settings relating to filtering content. The second processor allows the user library content file to be searched and filters search results based on the personal settings relating to filtering content. The second processor is in data communication with an external library access module for accessing a second portion of the multimedia content. The external library access module provides access to an external search engine used to identify the second portion of the multimedia content. The external search engine has an adjustable content filter, and the external library access module selects a setting of the adjustable content filter based on the personal settings relating to filtering content.

In still another embodiment, a method for identifying and accessing multimedia content from a network includes the steps: (a) filtering content described in a first compilation of data in strict adherence to personal settings relating to filtering content; and (b) using an external filter to filter content accessible from the network through an external search engine. A setting of the external filter is automatically selected based on the personal settings relating to filtering content.

DETAILED DESCRIPTION

Figure 1:
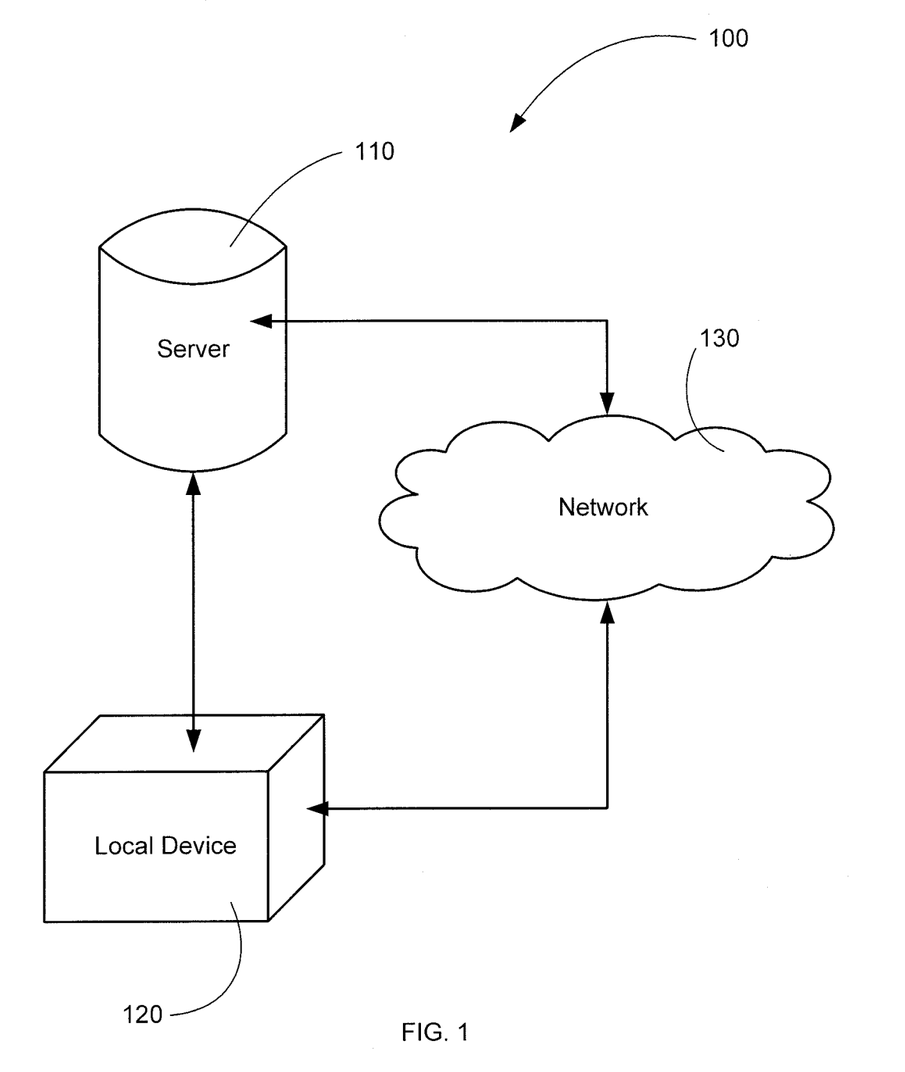
FIG. 1 shows a schematic overview of a system according to the current invention.

FIG. 1 shows a schematic overview of a system 100 for identifying and accessing multimedia content according to the current invention. In broad terms, the system 100 includes a server 110, a local device 120, and a network 130.

FIGS. 2 through 6 show one embodiment 1000 of the inventive system 100. With specific reference to FIG. 2, the system 1000 includes a server 1100, a local device 1200, and a network 1300 (e.g., the Internet, a wide area network, et cetera) having content 1310 and content data 1320 (i.e., information relating to the substance of the content 1310).

Figure 2:
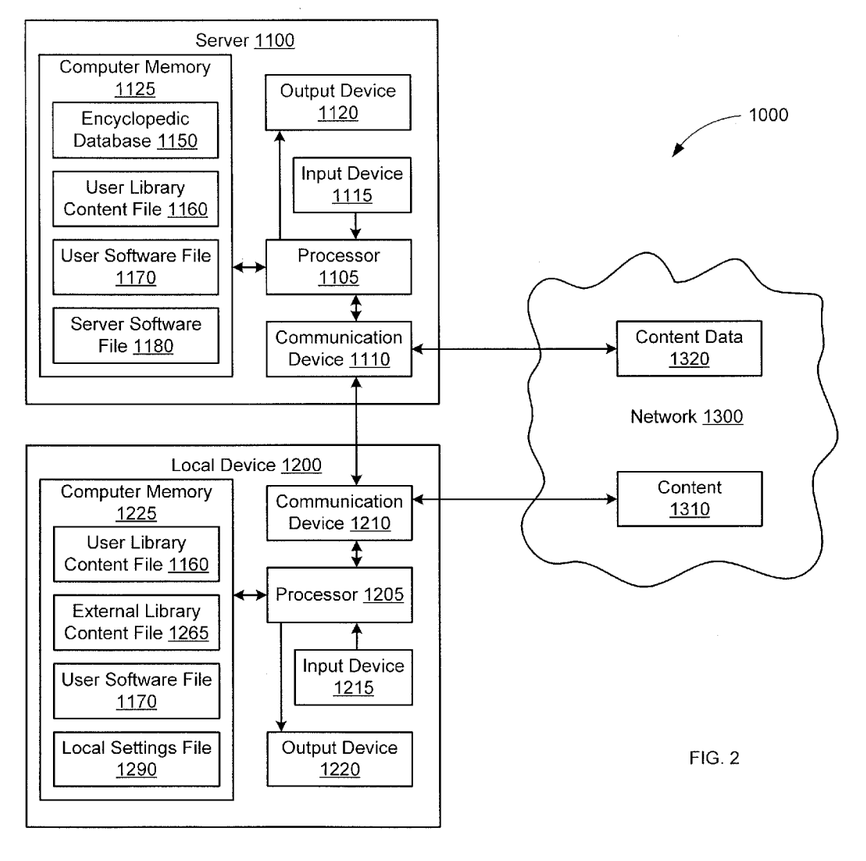
FIG. 2 shows a more detailed view of the system of FIG. 1, according to one embodiment.

The server 1100 includes a processor 1105 in data communication with a communication device 1110, an input device 1115, an output device 1120, and computer memory 1125. While this document shall often refer to elements in the singular, those skilled in the art will appreciate that multiple such elements may often be employed and that the use of multiple such elements is fully contemplated herein. For example, multiple processors may be used as the processor 1105 instead of a single processor.

The communication device 1110 may be a modem or any other appropriate device, whether now existing or later developed, for allowing the processor 1105 to communicate with the local device 1200 and the network 1300. In some embodiments, the communication device 1110 may be a single device for communicating with the local device 1200 and the network 1300, while in other embodiments multiple devices may be used.

The input device 1115 and the output device 1120 may be any appropriate devices, whether now existing or later developed, for providing data to and presenting data from the processor 1105. For example, the input device 1115 may include a computer mouse, a touchpad, and/or a keyboard; and the output device 1120 may include a display screen, a printer, and/or an audible alarm. In some embodiments, the input device 1115 and the output device 1120 may be combined, such as through a touch screen.

The computer memory 1125 may include volatile and non-volatile memory, and any appropriate data storage devices whether now existing or later developed may be used. The computer memory 1125 may store an encyclopedic database 1150, a user library content file 1160, a user software file 1170, and a server software file 1180. Again, the database and files 1150, 1160, 1170, 1180 may include multiple databases and files, as will be appreciated by those skilled in the art, and the use of the singular herein encompasses such multiple databases and files.

The encyclopedic database 1150 includes an extensive accumulation of data about the substance of the content 1310. For example, the encyclopedic database 1150 may include information about actors, directors, writers, scripts, key words, titles, story lines, genres, soundtracks, release dates, box office data, ratings, presence of adult content (e.g., language, drug use, nudity, et cetera), reviews, awards, historical context, and other data associated with the content 1310. The database 1150 may be built and maintained (i.e., supplemented/updated) in one or more of various ways. For example, the server software file 1180 may cause the processor 1105 (via the communication device 1110) to automatically access and store the content data 1320 from the network 1300 using web crawler software instructions. Or the content data 1320 in the network 1300 may be accessed and stored in a non-automated manner (i.e., with human input). Or data may be obtained from reviewing the content 1310 and then input into the encyclopedic database 1150 in an automated or non-automated manner; for example, closed captioning data may be input into the encyclopedic database 1150.

Figure 4A:
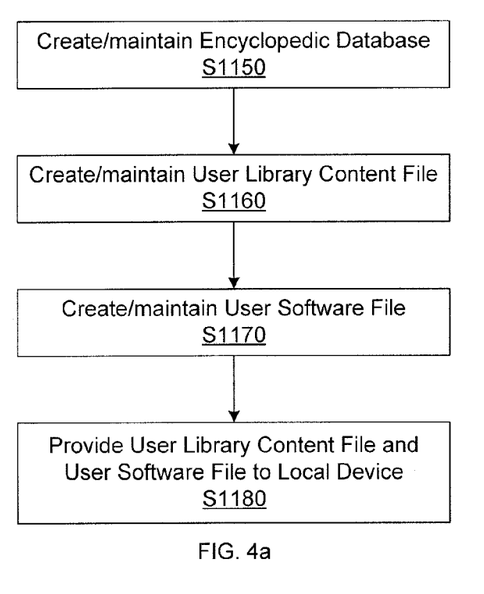
FIG. 4a shows high level steps associated with the server of the system of FIG. 2 when in use.
Figure 5A:
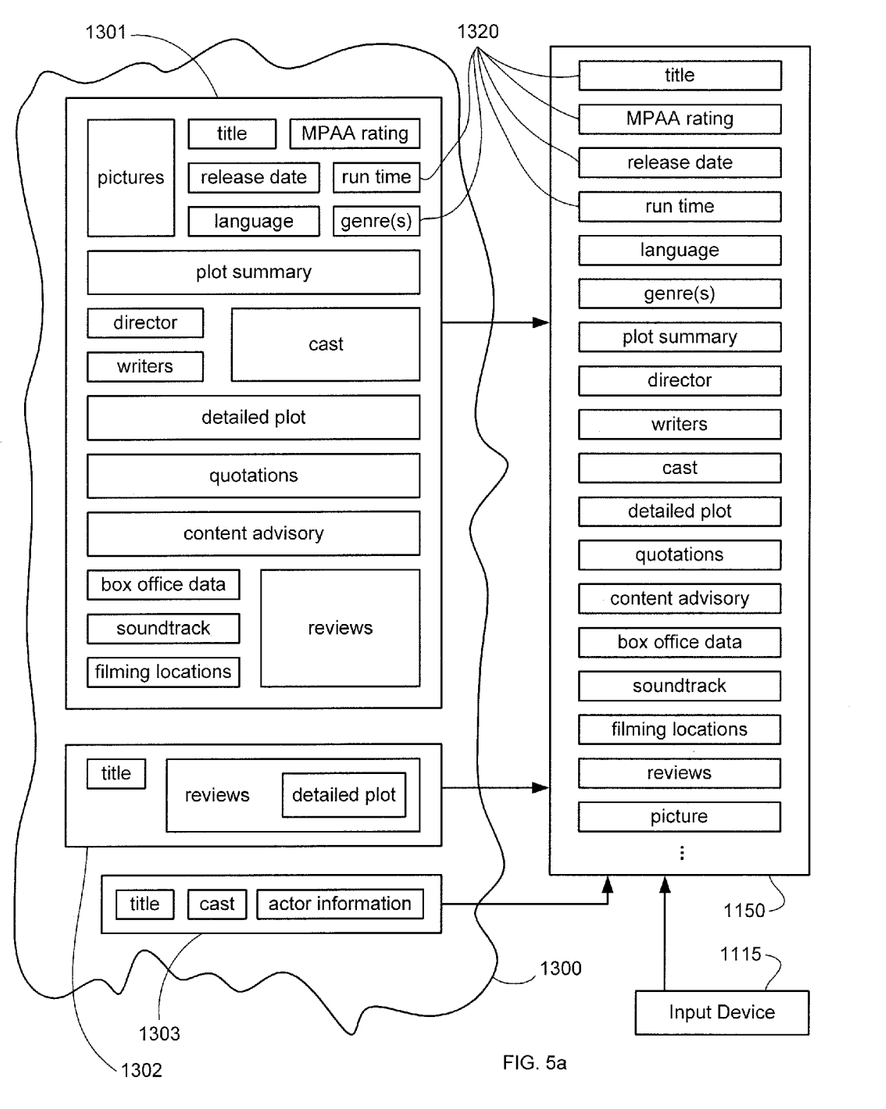
FIG. 5a shows creating/maintaining an encyclopedic database in the system of FIG. 2, according to one embodiment.

Creating/maintaining the encyclopedic database 1150 is illustrated at step S1150 in FIG. 4*a* and in FIG. 5*a*. FIG. 5*a* specifically shows the encyclopedic database 1150 obtaining content data 1320 from various websites 1301, 1302, 1303 on the network 1300, such as through web crawler software instructions, and also through the input device 1115.

The user library content file 1160 includes data distilled from the encyclopedic database 1150. Some of the data in the user library content file 1160 may be identical to data in the encyclopedic database 1150 (e.g., actor data, director data, writer data, title data, et cetera), and other data in the user library content file 1160 may be summaries, rankings, or other data processed from the data in the encyclopedic database 1150. The server software file 1180 may create the user library content file 1160 with or without human intervention.

Figure 5B:
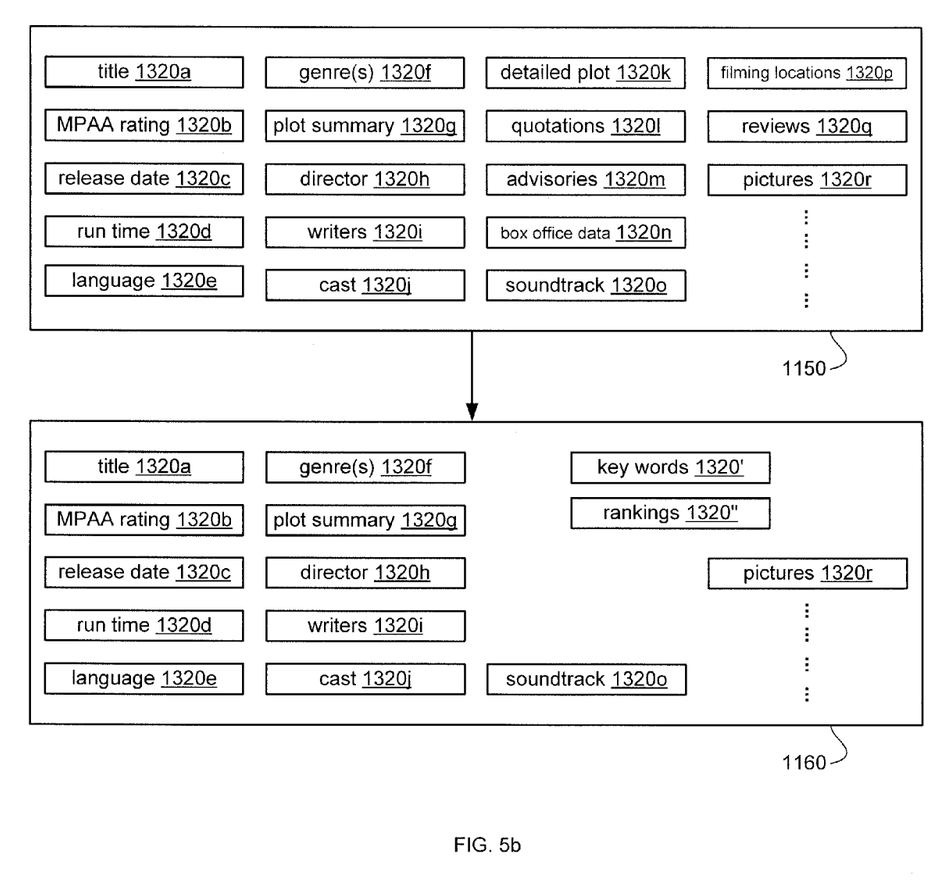
FIG. 5b shows creating/maintaining a user library content file in the system of FIG. 2, according to one embodiment.

Creating/maintaining the user library content file 1160 is illustrated at step S1160 in FIG. 4*a* and in FIG. 5*b*. FIG. 5*b* specifically shows the user library content file 1160 distilled from the encyclopedic database 1150 according to one embodiment. There, content data 1320 such as title data 1320*a*, MPAA rating data 1320*b*, release date 1320*c*, run time 1320*d*, language (or country of origin) data 1320*e*, genre data 1320*f*, plot summary data 1320*g*, director data 1320*h*, writer data 1320*i*, cast and crew data 1320*j*, soundtrack data 1320*o*, and picture data 1320*r* is substantially copied to the user library content file 1160; other content data 1320 such as detailed plot data 1320*k*, quotation data 1320*l*, content advisory data 1320*m*, box office data 1320*n*, and review data 1320*q* is transformed, for example, into key word data 1320' and ranking data 1320". In some embodiments, at least a portion of the ranking data 1320" is derived from content data 1320 that respectively includes rankings.

Returning to FIG. 2, the user software file 1170 includes computer instructions for operating the local device 1200, as discussed in further detail below, and the server software file 1180 includes computer instructions for operating the server 1100 as discussed above and below. Creating/maintaining the user software file 1170 in the server 1100 is illustrated at step S1170 in FIG. 4*a*. And among the various other instructions in the server software file 1180 may be instructions causing the processor 1105 to provide the updated user library content file 1160 and the updated user software file 1170 to the local device 1200 (via the communication device 1110), as illustrated at step S1180 in FIG. 4*a*. Alternately, the user software file 1170 may include instructions causing the user library content file 1160 and the user software file 1170 to be updated; or the files 1160, 1170 may be updated at the local device 1200 in other traditional manners.

Turning now to the local device 1200, though still with primary reference to FIG. 2, the local device 1200 may include a television with a set-top box, a personal computer, a tablet computer, et cetera. The local device 1200 includes a processor 1205 in data communication with a communication device 1210, an input device 1215, an output device 1220, and computer memory 1225. As noted above, reference to elements in the singular is used herein to refer to one or more of the elements unless specifically indicated to the contrary or apparent due to inoperativeness.

The communication device 1210 may be a modem or any other appropriate device, whether now existing or later developed, for allowing the processor 1205 to communicate with the server 1100 and the network 1300. In some embodiments, the communication device 1210 may be a single device for communicating with the server 1100 and the network 1300, while in other embodiments multiple devices may be used.

The input device 1215 and the output device 1220 may be any appropriate devices, whether now existing or later developed, for providing data to and presenting data from the processor 1205. For example, the input device 1215 may include a television remote control, a computer mouse, a touchpad, and/or a keyboard; and the output device 1220 may include a television screen, a display screen, et cetera. In some embodiments, the input device 1215 and the output device 1220 may be combined, such as through a touch screen.

Figure 4B:
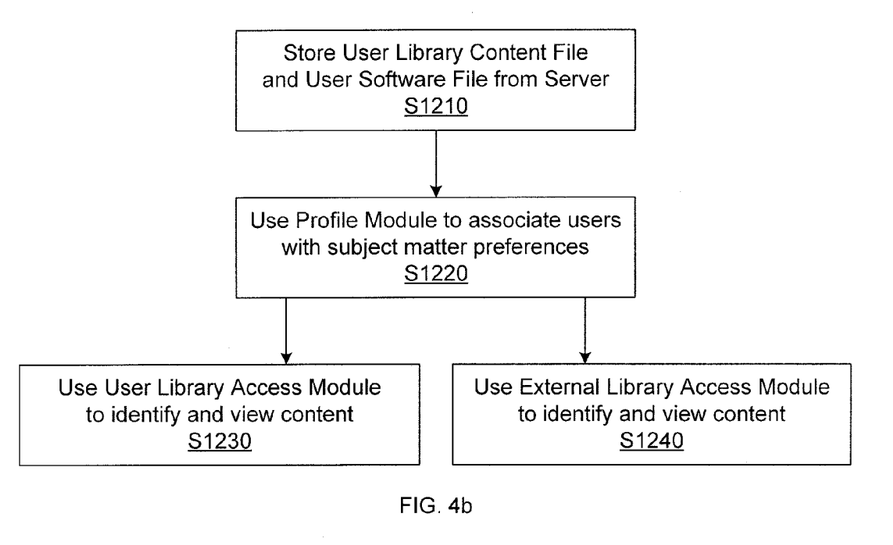
FIG. 4b shows high level steps associated with the local device of the system of FIG. 2 when in use.

The computer memory 1225 may include volatile and non-volatile memory, and any appropriate data storage devices whether now existing or later developed may be used. The computer memory 1225 may store a copy of the user library content file 1160, a copy of the user software file 1170, an external library content file 1265, and a local settings file 1290. Again, the files 1160, 1170, 1265, 1290 may include multiple files, as will be appreciated by those skilled in the art, and the use of the singular herein encompasses such multiple files. As illustrated in FIG. 4*b* at step S1210, the user library content file 1160 and the user software file 1170 may be obtained from the server 1100 and stored in the computer memory 1225.

Figure 3:
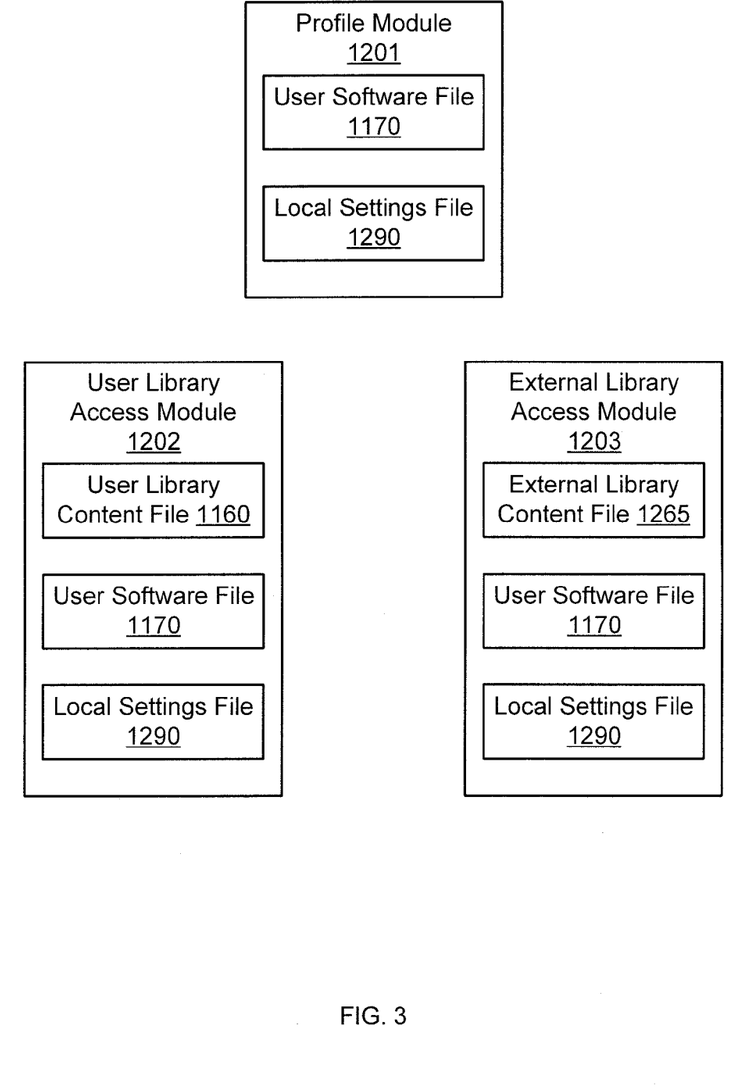
FIG. 3 shows various modules in the system of FIG. 2.

The various files in the computer memory 1225 are illustrated in FIG. 3 as conceptually separated into a profile module 1201, a user library access module 1202, and an external library access module 1203; each is addressed in turn. The profile module 1201 associates users with subject matter preferences 1295 and utilizes the user software file 1170 and the local settings file 1290. For example, each user may have a unique profile (inside the local settings file 1290) accessible using a unique login (e.g., passwords, biometric markers such as fingerprints, et cetera), and the user software file 1170 may be used to associate various preferences 1295 with the user profiles in the local settings file 1290. The various preferences 1295 may include, for example, settings related to violence 1295*a*, language 1295*b*, sex 1295*c*, mature themes 1295*d*, and an amount of content that may be viewed, preferences for how content is displayed, preferences for various genres, preferences for various actors, et cetera. Some of the preferences 1295 (e.g., settings 1295a, 1295b, 1295c, 1295d, displaying preferences, et cetera) may be input by the user, while other of the preferences (e.g., genre preferences, actor preferences, et cetera) may be input by the user and/or by the profile module 1201 (e.g., based on viewing history, search history, et cetera). An exemplary screen shot showing a user profile having various preferences 1295 selected is set forth in FIG. 6, and use of the profile module 1201 to associate users with subject matter preferences is illustrated in FIG. 4b at step S1220.

Moving on, the user library access module 1202 (FIG. 3) allows a user to search for and access a portion of the content 1310 on the network 1300, in accordance with his profile settings in the local settings file 1290. This is illustrated in FIG. 4b at step S1230. The user library access module 1202 utilizes the user library content file 1160, the user software file 1170, and the local settings file 1290; and the user software file 1170 specifically allows a user to search for and access content that is associated with data in the user library content file 1160, limited only by the user's particular profile settings in the local settings file 1290. Content that does not meet the requirements of the user's profile settings may be filtered out and thus not presented to the user. Content presented to the user may be displayed in accordance with preferences 1295 for how content is displayed. In some embodiments, preferences 1295 may affect the order in which content is displayed.

Once the user identifies content to access, a reference file (or "pointer file" or "link") in the user library content file 1160 may direct the processor 1205 to access the content 1310 on the network 1300. For example, the content 1310 may be accessed through Netflix, Hulu, or websites of other content providers. Because the user library content file 1160 may include detailed information about the content 1310, the associated content 1310 may be searched and filtered with great specificity regarding the subject matter and fine details of the content 1310. And in addition to resulting in superior output, searching and filtering based on the user library content file 1160 may provide substantial speed advantages over trying to search and analyze the content data 1320 directly from the network 1300.

The external library access module 1203 (FIG. 3) complements the user library access module 1202 and allows a user to search for and access a separate portion of the content 1310 on the network 1300, with consideration given to his profile settings in the local settings file 1290. This is illustrated in FIG. 4b at step S1240. The external library access module 1203 utilizes the external library content file 1265, the user software file 1170, and the local settings file 1290; and the user software file 1170 and the external library content file 1265 specifically allow a user to search for and access content that is not associated with data in the user library content file 1160 (or content that is associated with insufficient data in the user library content file 1160). For example, content 1310 that is accessible through YouTube and that has little or no associated content data 1320 (and thus little or no associated data in the user library content file 1160) may be searched and accessed.

Because of insufficient data about the content 1310 accessed through the external library access module 1203, the user's particular profile settings in the local settings file 1290 may not be directly utilized. Instead, the external library content file 1265 may reconcile the user's particular profile settings in the local settings file 1290 with filter settings in an external search engine that can identify and access the content 1310. Reconciliation may occur based on various principles, with the goal being to filter out truly unwanted content 1310 and provide access to acceptable content 1310.

A stringent reconciliation may ensure that the filter settings in an external search engine are at least sufficient to meet all of the restrictions in the user's particular profile settings in the local settings file 1290. For example, if an external search engine has four levels of filtering (with level four being most restrictive), if all but one of a user's profile settings are met by the settings in level two, and if the remaining setting is met by the settings in level four, the external library access module 1203 may activate level four of the external search engine filter. If an external search engine does not have filter settings that meet all of the restrictions in the user's profile settings, the external library access module 1203 may completely block access to the external search engine.

In a less stringent reconciliation, the external library access module 1203 may disregard one or more of the user's profile settings based on such factors as the degree to which the user's other profile settings are met by a particular filter setting in an external search engine, the identity of the particular profile setting that is not met by an external filter setting, et cetera. For example, if an external search engine has four levels of filtering (with level four being most restrictive), if all but one of a user's profile settings are met by the settings in level two, and if the remaining setting is met by the settings in level four, level two may be used unless the remaining profile setting is required to be met due to its specific identity (e.g., if the remaining setting is language-related, level two may be used; if the remaining setting is related to sexual content, use of level four may be required).

Whether the external library access module 1203 uses a stringent reconciliation or a less stringent reconciliation may depend on a user-selected setting in the local settings file 1290 or the external library content file 1265, or may be selected without user input. Similarly, the specific identity of user profile settings that must be met by an external search engine filter (e.g., sexual content in the example given above) may depend on user-selected settings in the local settings file 1290 or the external library content file 1265, or may be selected without user input. Once appropriate content 1310 is identified using the external search engine, the external search engine may be used to access the content 1310. Although the content 1310 accessible through the external library access module 1203 may not be searched and filtered to the extent of the content 1310 accessible through the user library access module 1202, it may nevertheless be desirable to provide access to this additional multimedia content.

Figure 6:
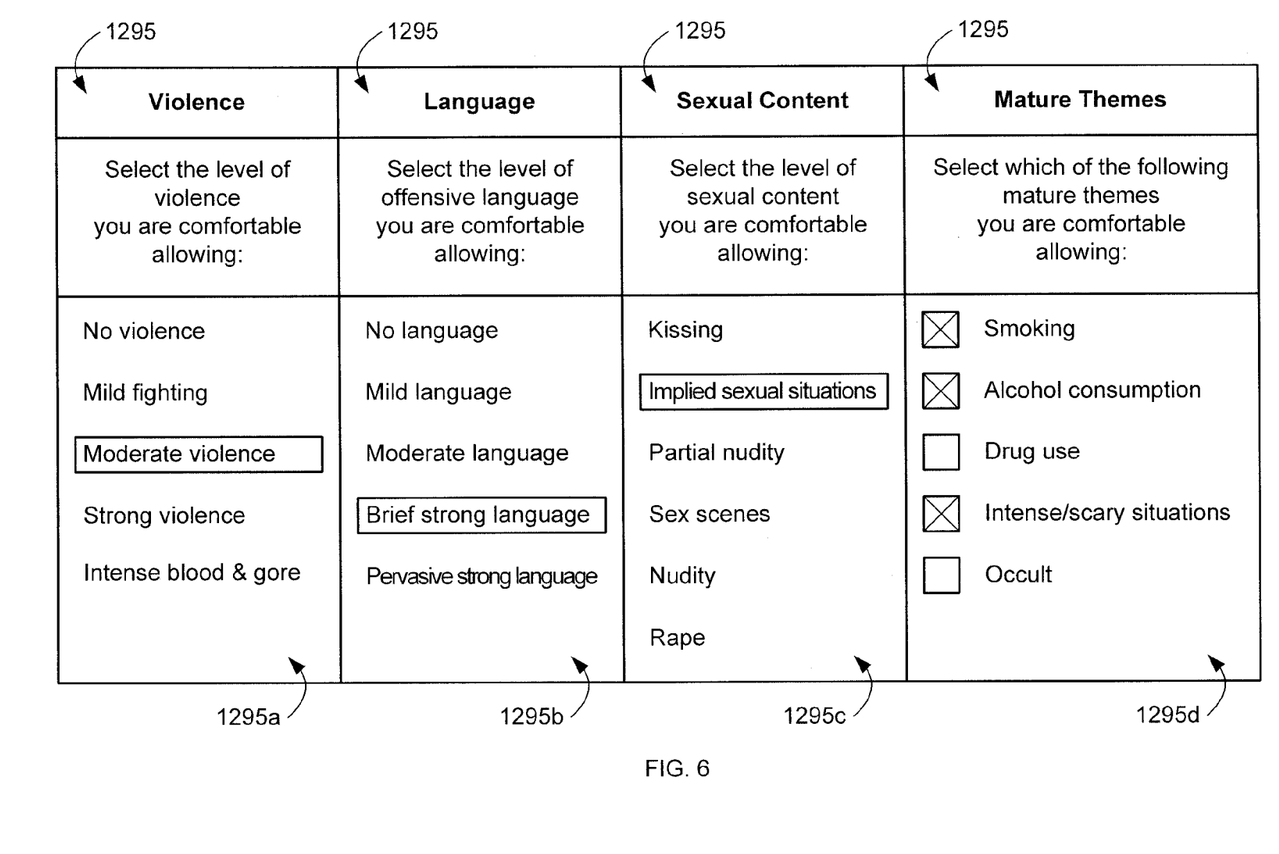
FIG. 6 shows an exemplary screen shot illustrating various preferences in the system of FIG. 2.

The following description is an example of the system 100 in use according to an embodiment. At the step 1220, a user may create a profile through the profile module 1201, associating the user with subject matter preferences 1295. As shown in FIG. 6, for example, levels of violence 1295a, language 1295b, sexual content 1295c, and mature themes 1295d may be selected.

At the step S1150, the encyclopedic database 1150 may be created/maintained to include, among a myriad of other data, the following data 1320 about every movie and TV show in which Tom Hanks acted, directed, produced, wrote, or performed in a soundtrack, and about every movie and TV show in which the name "Tom Hanks" is used or mentioned: title data 1320a, MPAA rating data 1320b, release date 1320c, run time 1320d, language (or country of origin) data 1320e, genre data 1320f, plot summary data 1320g, director data 1320h, writer data 1320i, cast and crew data 1320j, detailed plot data 1320k, quotation data 1320l, content advisory data 1320m, box office data 1320*n*, soundtrack data 1320*o*, filming location data 1320*p*, review data 1320*q*, ranking data, and script data.

From there, at the step S1160, the user library content file 1160 is distilled from the encyclopedic database 1150. In the distilling process, some of the content data 1320 may be substantially copied to the user library content file 1160 (e.g., title data 1320*a*, MPAA rating data 1320*b*, release date 1320*c*, run time 1320*d*, language (or country of origin) data 1320*e*, genre data 1320*f*, plot summary data 1320*g*, director data 1320*h*, writer data 1320*i*, cast data 1320*j*, soundtrack data 1320*o*, and filming location data 1320*p*); and other content data 1320 (e.g., detailed plot data 1320*k*, quotation data 1320*l*, content advisory data 1320*m*, box office data 1320*n*, review data 1320*q*, ranking data, and script data) may be transformed (e.g., into key word data 1320' and ranking data 1320").

By accessing the user library content file 1160 and the stored profile settings in the local settings file 1290, the user library access module 1202 can search and filter the content 1310 associated with the content data 1320 at a very fine level. For example, by searching for "Tom Hanks", all of the content 1310 in which Tom Hanks acted, directed, produced, wrote, or performed in a soundtrack, and all of the content 1310 in which the name "Tom Hanks" is used or mentioned may be filtered in accordance with the profile settings and then presented by the user library access module 1202. The order in which the user library access module 1202 presents the filtered results may be selected based on various predetermined rules; for example, content 1310 in which Tom Hanks acted may be presented before content 1310 in which Tom Hanks produced and content 1310 in which "Tom Hanks" is mentioned. So "Forrest Gump" (a film in which Tom Hanks was an actor) may be displayed before "Where The Wild Things Are" (a film in which Tom Hanks was a producer) and "Bamboo Shark" (a film that mentions "Tom Hanks"). Because the user library access module 1202 references the user library content file 1160, films such as "Catch Me If You Can" (a film in which Tom Hanks was an actor) may be filtered out for including smoking if the user profile does not allow smoking to be shown. For another example, "Apollo 13" (a film in which Tom Hanks was an actor) may be one of many results in a user search for "moon", "lunar", "astronaut", "NASA", or "survive"—assuming the profile settings do not require "Apollo 13" to be filtered out of the results. A reference file in the user library content file 1160 may direct the processor 1205 to access the content 1310 on the network 1300 once the content 1310 is selected.

To search for content 1310 which is not adequately described in the user library content file 1160, the external library access module 1203 may be utilized. For example, the external library content file 1265 may reconcile the user's particular profile settings in the local settings file 1290 with filter settings in a YouTube search engine. The YouTube search engine (with its filter settings appropriately engaged) may then be used to identify and access content 1310.

Figure 7:
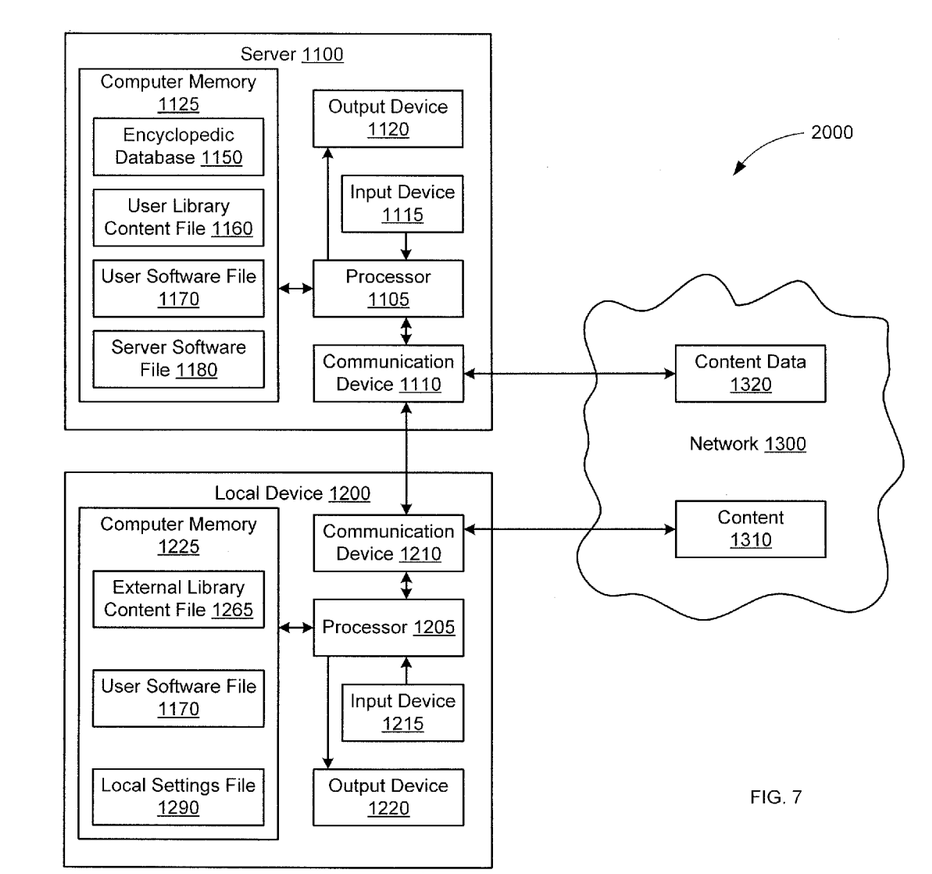
FIG. 7 shows a more detailed view of the system of FIG. 1, according to another embodiment.

FIG. 7 shows another embodiment 2000 of the inventive system 100 that is substantially similar to the embodiment 1000, except as specifically noted and/or shown, or as would be inherent. Further, those skilled in the art will appreciate that the embodiment 1000 (and thus the embodiment 2000) may be modified in various ways, such as through incorporating all or part of any of the various described elements, for example. For uniformity and brevity, corresponding reference numbers may be used to indicate corresponding parts, though with any noted deviations.

In embodiment 2000, the user library content file 1160 remains solely on the server 1100 (and not on the local device 1200). As such, the local device 1200 accesses the user library content file 1160 at the server 1100 (via the communication device 1210) for using the user library content file 1160. This arrangement may be desirable, for example, to eliminate periodic updating of the user library content file 1160 at the local device 1200, to retain exclusive control of the user library content file 1160, or if the local device 1200 has very limited computer memory capacity. Similarly, though not shown in FIG. 7, those skilled in the art will appreciate that the local settings file 1290 may be located on the server 1100 in addition to, or instead of, on the local device 1200.

Figure 8:
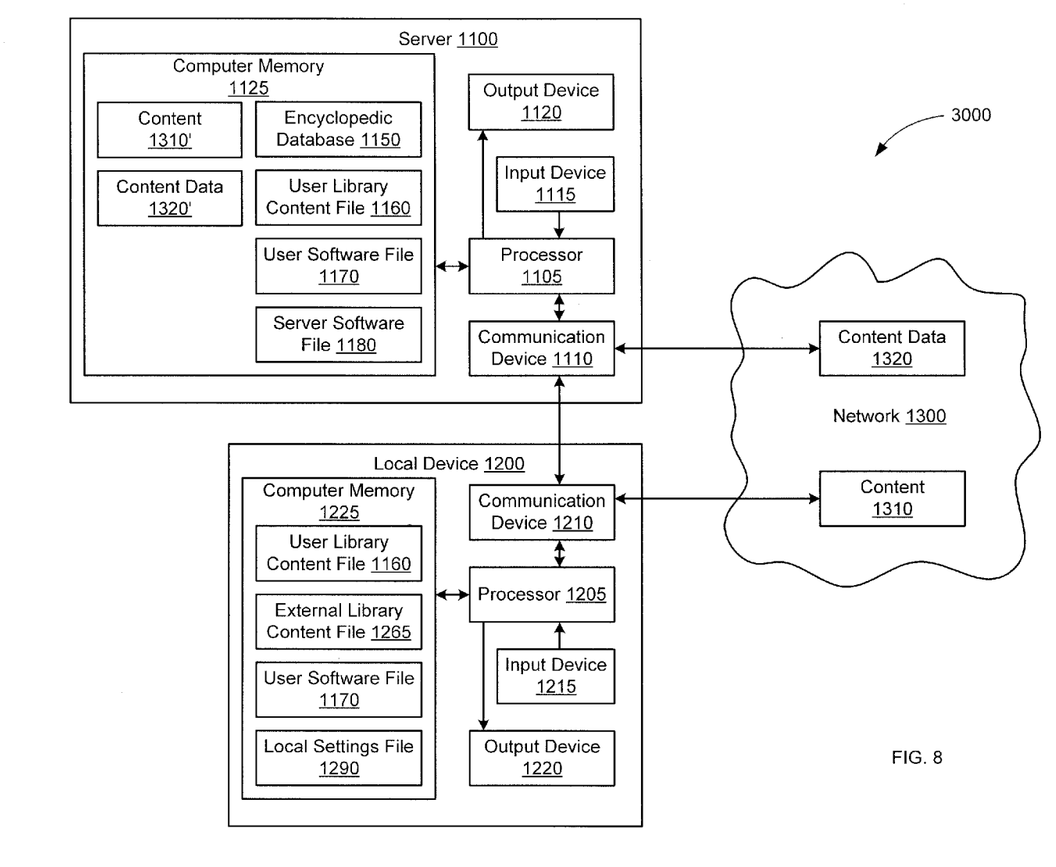
FIG. 8 shows a more detailed view of the system of FIG. 1, according to still another embodiment.

FIG. 8 shows still another embodiment 3000 of the inventive system 100 that is substantially similar to the embodiment 1000, except as specifically noted and/or shown, or as would be inherent. Further, those skilled in the art will appreciate that the embodiment 1000 (and thus the embodiment 3000) may be modified in various ways, such as through incorporating all or part of any of the various described elements, for example. For uniformity and brevity, corresponding reference numbers may be used to indicate corresponding parts, though with any noted deviations.

In embodiment 3000, content 1310' and content data 1320'—which may be generally similar to the content 1310 and the content data 1320, respectively—is housed on the server 1100. The encyclopedic database 1150 may include an extensive accumulation of data about the substance of the content 1310', just as it does about the content 1310; and the distilled data in the user library content file 1160 may relate to the content 1310', just as it does to the content 1310. Moreover, the user library access module 1202 may allow a user to search for and access the content 1310', just as it allows access to a portion of the content 1310 on the network 1300. Accordingly, the primary affect of the location of the content 1310, 1310' may simply be that reference files may point to the server 1100 to access the content 1310', and may point to the network 1300 to access the content 1310.

Similarly, though not shown in FIG. 8, those skilled in the art will appreciate that the content 1310' may be located in the local device 1200, may be accessed through a cable television service or a satellite television service, or may otherwise be located remote from the server 1100 and the local device 1200. Further, the content data 1320' may be located on the local device 1200, may be accessed from a remote location outside the network 1300 (e.g., through a cable television service or a satellite television service), or may be present on the network 1300.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. While various files and software have been described as enabling specific functions, those skilled in the art will appreciate that files and software may be commingled or further segregated, and that specific file or software labels are used for convenience.

What is claimed is:

1. A system for identifying and accessing multimedia content from a network, the system comprising:
- a server having a first processor in data communication with: a first communication device, a first input device, a first output device, and first computer memory; the first computer memory having an encyclopedic database; the encyclopedic database being separate from the multimedia content and having an accumulation of subject matter data about a first portion of the multimedia content; and
- a local device having a second processor in data communication with: a second communication device, a second input device, a second output device, and second computer memory;
- wherein the second processor is in data communication with a user library content file located in at least one of the first computer memory and the second computer memory, the user library content file being separate from the encyclopedic database and having data distilled from the encyclopedic database;
- wherein the second processor is in data communication with a user local settings file located in at least one of the first computer memory and the second computer memory, the user local settings file having personal settings relating to filtering content;
- wherein the second processor allows the user library content file to be searched and presents search results based on the personal settings; and
- wherein the second processor is in data communication with an external library access module for accessing a second portion of the multimedia content, the external library access module providing access to an external search engine used to identify the second portion of the multimedia content, the external search engine having an adjustable content filter, the external library access module selecting a setting of the adjustable content filter based on the personal settings relating to filtering content.

2. The system of claim 1, wherein the user library content file is located in the first computer memory.

3. The system of claim 1, wherein the user library content file is located in the second computer memory.

4. The system of claim 1, wherein an adjustable content filter is a content filter than can be activated and deactivated.

5. The system of claim 1, wherein an adjustable content filter is a content filter having a plurality of settings for filtering different types of content.

6. The system of claim 1, wherein selecting a setting of the adjustable content filter based on the personal settings relating to filtering content comprises:
- selecting a setting of the adjustable content filter that meets all of the personal settings relating to filtering content.

7. The system of claim 1, wherein selecting a setting of the adjustable content filter based on the personal settings relating to filtering content comprises:
- selecting a setting of the adjustable content filter that meets at least one of the personal settings relating to filtering content.

8. The system of claim 1, wherein the data distilled from the encyclopedic database includes a plurality of reference files for accessing the first portion of the multimedia content.

9. The system of claim 1, wherein the user local settings file further includes personal settings relating to at least one of: (a) displaying content; and (b) recommending content.

* * * * *